US005149139A

United States Patent [19]

Kaule

[11] Patent Number: 5,149,139

[45] Date of Patent: Sep. 22, 1992

[54] STAMP SUCH AS A POSTAGE STAMP AND A METHOD FOR PRODUCING IT

[75] Inventor: Wittich Kaule, Emmering, Fed. Rep. of Germany

[73] Assignee: GAO Gesellschaft für Automation und Organisation mbH, Munich, Fed. Rep. of Germany

[21] Appl. No.: 403,022

[22] Filed: Sep. 5, 1989

Related U.S. Application Data

[63] Continuation of Ser. No. 855,371, Apr. 24, 1986, abandoned.

[30] Foreign Application Priority Data

Apr. 24, 1985 [DE] Fed. Rep. of Germany ....... 3514852

[51] Int. Cl.[5] ........................ B42D 15/00; G09C 3/00

[52] U.S. Cl. ........................................ 283/70; 283/71; 283/82; 283/83; 283/92; 283/94

[58] Field of Search ....................... 283/67, 70, 71, 82, 283/83, 92, 94

[56] References Cited

U.S. PATENT DOCUMENTS

| | | | |
|---|---|---|---|
| 3,105,906 | 10/1963 | Burkhardt et al. | 250/219 |
| 3,136,424 | 6/1964 | Silverschotz | 283/71 |
| 3,565,463 | 2/1971 | Taylor | 283/71 |
| 4,089,995 | 5/1978 | Ferro et al. | 283/71 |
| 4,451,521 | 5/1984 | Kaule et al. | 428/690 |

FOREIGN PATENT DOCUMENTS

| | | | |
|---|---|---|---|
| 647929 | 3/1936 | Fed. Rep. of Germany . | |
| 1181537 | 11/1964 | Fed. Rep. of Germany . | |
| 3514852 | 10/1986 | Fed. Rep. of Germany | 283/71 |
| 1494103 | 12/1977 | United Kingdom . | |

*Primary Examiner*—Paul A. Bell
*Attorney, Agent, or Firm*—Foley & Lardner

[57] ABSTRACT

Stamps such as postage stamps, fee stamps, etc., involve the problem of being machine testable with respect to their position on the carrier and their authenticity, and of assuring that they can only be used once. A stamp is proposed with characterizing printing thereon and an adhesive layer for attaching it to a carrier, said stamp containing a machine-testable marking material suitable for automatic processing, the marking material being provided in the adhesive layer.

10 Claims, 1 Drawing Sheet

STAMP SUCH AS A POSTAGE STAMP AND A METHOD FOR PRODUCING IT

Figure 1:
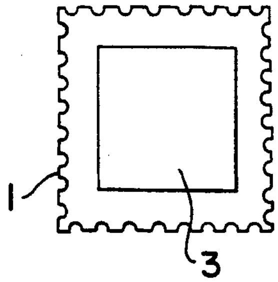

This application is a continuation of application Ser. No. 06/855,371, filed Apr. 24, 1986, now abandoned.

The present invention relates to a stamp such as a postage stamp, fee stamp, etc., comprising at least a sheet of paper or synthetic material with printing thereon characterizing the stamp, and an adhesive layer for attaching the stamp to a carrier, and containing a machine-testable marking material suitable for automatic processing.

Mail such as letters are being processed increasingly in automatic sorters and sorted in accordance with their destinations. This sorting involves the destination, characterized by the area code, first being read by a processing person or machine and printed on the letter in a machine-readable code suitable for further automatic processing. Fluorescent printing inks are generally used herefor. A corresponding method is described in U.S. Pat. No. 3,105,908.

In order to allow for, or simplify, automatic processing it is necessary to arrange the letters in accordance with their positions. This means that all letters must be aligned so that the address and thus the area code always appear in the same place, if possible. Since the postage stamp is generally disposed in the upper right-hand corner of a letter, this alignment can be performed with reference to the position of the postage stamp. Furthermore, the stamp can be selectively canceled automatically, e.g. by applying a postmark, when the position of the postage stamp has been detected.

To make it possible for a machine to detect the position of the postage stamp, paper, for example, containing a fluorescent substance is used to produce the postage stamp. This substance is either mixed directly into the paper pulp or applied to the paper by conventional coating methods. Methods for producing such fluorescent paper for postage stamps are disclosed in British Pat. No. 14 94 103 and German Pat. No. 11 81 537. The admixture of a fluorescent substance to the paper for postage stamps not only allows for machine processing but also serves to increase their protection against forgery.

Automatic mail sorting is advantageous in that large quantities can be processed or sorted within a short time with low personnel expenditure. However, this generally means that letters with postage stamps which are already canceled and have already been used before remain unnoticed. When such letters were processed previously by hand, they were immediately recognized and singled out by experienced staff.

It is extremely difficult for a machine to detect a postmark optically since it is necessary to distinguish the postmark from the printing on the postage stamp. This distinction is very difficult because the postmark or usually only part of it can appear in any place whatsoever on the postage stamp, on the one hand, and a great number of postage stamps with a great variety of printed patterns are always in circulation, on the other hand.

In addition, the inks generally used for the postmarks can be removed using suitable solvents so that these stamps can no longer be distinguished from other fresh ones. Cancellation by applying a postmark thus does not provide sufficient protection against illegal reuse of stamps.

Apart from the fact that the reuse of stamps is actually illegal, it also involves considerable losses since a great number of letters are conveyed by the post office for free, for example. Similar problems arise in the case of fee stamps which are applied to documents which are then sorted or processed automatically. Values up to DM 100.00 and more are not unusual in the case of fee stamps. It is therefore a matter of urgent interest to be able to check whether this fee stamp has already been used before.

The invention is therefore based on the problem of providing a stamp which can be applied to a carrier, can be machine-tested with respect to its position on the carrier and its authenticity, and for which a machine can furthermore detect whether it has already been used before.

This problem is solved by the feature contained in the characterizing part of the main claim.

Advantageous developments of the invention are the subject of the subclaims.

The inventive solution meets the requirements mentioned in the problem by means of a simple measure having a surprising effect.

The marking feature contained in the adhesive layer is detectable by a machine, thus providing the precondition for automatic processing and automatic detection of authenticity.

The inventive solution takes not only the desire for automatic testability into consideration but also the requirement that the stamp not be "canceled" when being moistened to be stuck on but that the characterization of its validity still be destroyed when the stamp which has already been stuck on is detached.

In the case of unauthorized reuse, the stamp is removed from the carrier by dissolving the adhesive layer connecting the carrier and the stamp. The adhesive layer on postage stamps (gum) is water-soluble and the stamp can therefore be detached by using water vapor or in a water bath. The stamp is then attached to the other carrier using commercial adhesives. In the case of the inventive stamp, the marking substance is removed from the stamp at the same time as the adhesive layer is dissolved. If this stamp is then applied to another letter using a commercial adhesive, this letter will be classified as unfranked during automatic sorting due to the lack of marking material, and can be subjected to appropriate special treatment. Even if remains of the adhesive provided with marking material are retained on the stamp when it is being detached, this is detected due to the greatly reduced effect of the remaining material.

When a stamp is being used for the first time, the adhesive layer is merely moistened, however. The adhesive layer itself is retained so that the stamp is not canceled during this process.

No or very little resetting is required in existing sorters to enable them to detect the reuse of stamps. It suffices in most cases to adapt the sensors to detect the marking substance contained in the inventive stamp.

The inventive stamp is also advantageous in that the paper manufacture for the stamps is substantially simplified, since it can be performed independently of the addition of the marking substance. Special precautions when making the paper pulp or additional paper coating processes may be dispensed with.

The adhesive or gum is generally provided in the production of stamps in the form of a solution following the printing process and then dried. The printed paper web is then perforated and cut into sheets suitable for sale.

The marking substance is preferably mixed directly into the adhesive solution so that the marking substance is applied automatically during this coating process which is necessary anyway. Since the marking substance penetrates the entire volume of the adhesive layer, very high concentrations can be obtained. Consequently, a high degree of machine detectability is possible.

The fact that the application of the marking substance is one of the last method steps involves further advantages. For example, the stamps can be provided with different marking substances depending on their value. This coding can take place after the paper has been finished and the printing process is over so that it is not necessary to make a special or specially prepared paper for stamps of a certain value. Processing and management of the various kinds of paper in accordance with specific stamps, and the great organizational efforts this involves, are thus avoided by the inventive solution in a simple manner.

Subsequent coding is also advantageous in that the marking substance can be applied to the adhesive layer selectively, e.g. in the form of a bar code. Known printing techniques can be used herefor, attention being paid that the marking substance is not removed, or only slightly removed, when the adhesive layer is moistened later. The marking substance is preferably applied to the adhesive layer or gum when it is still wet by means of an ink jet printer. The marking substance contained in a suitable solvent thereby penetrates this layer.

An alternative to this is to apply the adhesive layer in two steps, the marking substance being applied between the two steps.

The inventive stamp also provides the philatelist with the fundamental possibility of ascertaining, or having it ascertained, whether a stamp still has the original gum on it. It is known that stamps having the original gum are traded with a much higher value in collectors' circles than stamps lacking gum. The stamps without gum have often been made more valuable by having gum applied to them subsequently.

The inventive solution makes such an attempted falsification much more difficult since special gum substances or admixtures are used in this case. The forger can therefore not resort to commercial products when applying an adhesive layer.

Further advantages and advantageous developments are the subject of the subclaims and dealt with in the following detailed description of the inventive subject with reference to the figures. These show:

FIG. 1 an inventive stamp

Figure 2:
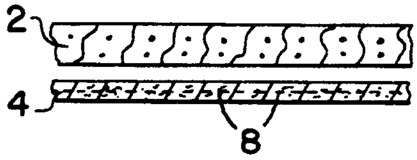
Figure 3:
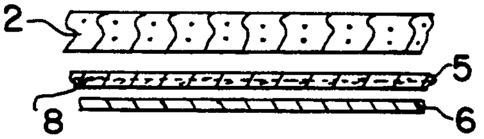
Figure 4:
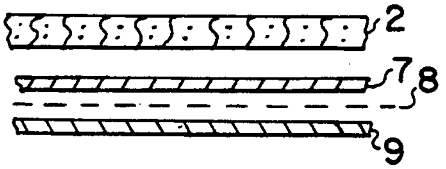

FIGS. 2-4 cross-sectional views of various embodiments of an inventive stamp (the individual layers are shown separately for the sake of clarity)

Figure 5:
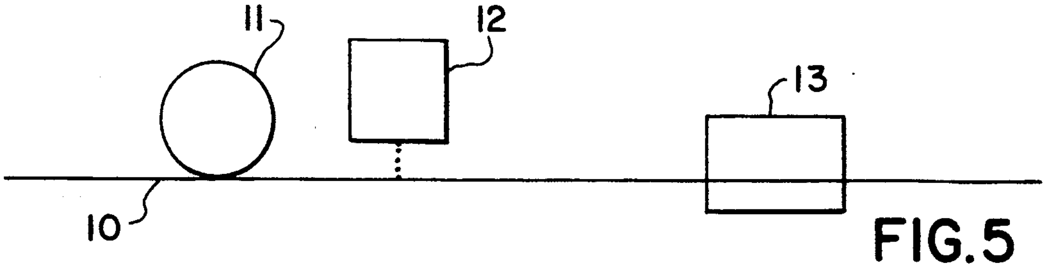

FIG. 5 a schematic view of an apparatus for making inventive stamps

Figure 6:
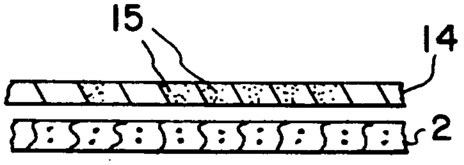

FIG. 6 a cross-sectional view of a stamp made thereby

FIG. 1 shows a stamp 1. The stamp comprises a sheet 2 of paper or synthetic material (FIG. 2) and shows a printed pattern 3 on the front. The back of the stamp is provided with an adhesive layer or gum 4 (FIG. 2) which shows its adhesive properties when moistened. Adhesives suitable for stamps are gum arabic and dextrin, for example. The artificial adhesives have the property of needing little water for moistening to obtain their maximum adhesive power within a very short time. Other possible adhesives are animal or fish glue, for example. These adhesives are also applied in the form of a solution by known gumming methods to the paper web which has already been printed but not yet cut to size, and then dried.

In a preferred embodiment, a marking substance 8 is added to the adhesive solution before it is applied to the paper. This marking substance can be detected by a machine through paper layer 2. It can be present in the adhesive layer either in a dissolved form or in the form of pigments or individual particles distributed homogeneously throughout the entire volume. Due to the relatively high density of the adhesive layer and the penetration of the marking substance in the entire volume—the amounts of these adhesive layers applied are generally between 18 and 35 g/m$^2$ —the stamps can be provided with a high proportion of marking substance, resulting in a high degree of machine processability. The marking substance itself can be, for example, a fluorescent substance, a magnetic substance or an electrically conductive substance.

Suitable fluorescent substances are luminophores which can be excited in the visible or infrared (IR) spectral ranges and also emit in these spectral ranges, since in these ranges the transmitted portion of electromagnetic radiation through paper is relatively high. In the UV range, however, many kinds of paper (depending on the type of filler) show strong absorption so that luminophores which can be excited in the UV are not suitable for all kinds of paper. A particularly suitable luminophore, for example, is chlorophyll which is excitable in the visible range and emits in the IR.

For a magnetic marking, 2% of a magnetizable iron oxide (e.g. Mag 1730 of Bayer Leverkusen) can be added to the adhesive layer (e.g. gum arabic). For machine detection, a sensor means can be used which comprises a magnetizing unit, e.g. a permanent magnet, and a following sensor unit, which the carrier bearing the stamp is directed past. The sensor unit comprises a plurality of magnetic heads disposed in a row at right angles to the direction of transport which are used for detecting the marking substance. An electrically conductive marking is obtained by mixing a metal powder or pieces of metallic thread into the adhesive layer. Detection is effected without contact, e.g. by known capacitative measuring methods (EP-A 97 570) or by aid of microwaves (German offenlegungsschrift 30 16 698).

Since the adhesive layer of a stamp is often activated by being moistened by the tongue, the marking substances, if they are located in the outer areas of the adhesive layer, must comply with the terms of the food laws. Chlorophyll, for example, is such a luminophore which complies with these regulations.

In order to be independent of the food laws, one can also apply the marking substance only in inside areas of the adhesive layer located in the vicinity of the paper layer. The adhesive layer is applied for this purpose in two steps, the adhesive layer applied in the first step containing the marking material while the adhesive layer applied in the second step is free from marking substance. This results in a layer structure with a dual component adhesive layer 5 and 6, as shown in FIG. 3, layer 5 containing the marking substance 8.

The marking substance can also be printed onto the adhesive layer in a separating procedural step. FIG. 4 shows the layer structure of such a stamp. An adhesive layer 7 is first applied to the stamp as in the previous example. Marking substance 8 is then printed onto this layer and then covered by second adhesive layer 9. The marking substance is thus enclosed between the two adhesive layers. The stamp can consequently be moistened in the usual way to be applied to a carrier without there being any danger of the marking substance being removed during moistening.

Using suitable printing methods, the marking substance can also be applied directly to the outer surface of the adhesive layer (FIG. 5). For this purpose, the paper web 10 already provided with the graphic printing is first fed to a gumming unit in which an adhesive solution is applied via a roller 11 by known methods. This gumming unit is followed by an ink jet printer 12 by aid of which the marking substance is applied to the adhesive solution which is still wet. The marking substance is contained hereby in a suitable liquid solution so that the marking substance penetrates the adhesive solution when hitting it. The adhesive solution is then dried in drying unit 13. FIG. 6 finally shows the resulting adhesive layer 14. Marking substance 15 penetrates it as far as areas extending deep into the layer. This stamp can thus also be moistened by the usual method without a noticeable portion of the marking substance being removed.

The application of the marking substance by means of a printing method is advantageous in that the marking substance can thereby be applied to the stamp in a selective form. This results in the possibility of coding it to characterize a certain value or class, and thus in the possibility of machine detecting and testing the value of the stamp, for example, during automatic processing. This coding can be carried out, for example, in the form of a bar code or in the form of a plurality of concentric rings of different ring thicknesses and/or diameters. The latter possibility allows for testing of the stamp independently of its particular orientation when passing through the test apparatus.

The bar code or concentric rings are printed onto the adhesive layer in a constantly repeated sequence, and are dimensioned so as to ensure that a complete code will always be present on each individual stamp after the paper web has been cut to size. Since the paper web is generally already provided with the graphic printing before the adhesive layer is applied, however, this fact can be made use of to print the marking substance onto the adhesive layer in a locally selective fashion congruent with the printed pattern.

A further advantageous development of the inventive stamp consists in adding to the adhesive layer or printing onto the adhesive layer a plurality of different marking substances. For example, if four different marking substances are provided, this results in fifteen possibilities of combination for applying these marking substances and thus characterizing the different stamps. Such a coding method is described in more detail in German offenlegungsschrift 21 25 336. However, luminescent substances are used therein which are excited in the UV and are therefore less suitable for the present invention. But the principle of coding can also be realized using other marking substances, e.g. using luminophores excitable and emitting in the IR or in the visible range.

I claim:

1. A method of automatically detecting with a machine the presence of a previously-used postage-type stamp while said stamp is attached to a carrier substrate, comprising the steps of:

passing through a machine a carrier substrate having adhesively adhered thereto a stamp comprised of a base sheet of non-transparent paper or synthetic material and a layer of adhesive on the base sheet of paper or synthetic material adhering said stamp to said carrier substrate, said layer of adhesive containing a machine-testable marking substance suitable for automatic processing and detectable by a machine through the paper or synthetic material comprising the stamp base sheet, wherein said marking substance is contained within said adhesive layer in such a way that said marking substance is not substantially lost through normal moistening of the adhesive to adhere the stamp, but wherein said marking substance is incorporated into the adhesive layer in such a way that at least a substantial portion of the marking material is removed upon detachment of the stamp from a previous carrier substrate to which the stamp has been adhered by said adhesive layer;

performing a machine reading through said stamp base sheet, while said stamp is adhered to said carrier substrate, to determine the presence of said machine-testable marking substance in said adhesive layer; and making a determination of the validity of said stamp, including whether said stamp has been previously adhesively adhered to a carrier substrate and subsequently removed therefrom, based upon the amount of marking substance detected to be present in said adhesive layer.

2. A method according to claim 1, wherein the marking substance is excitable in the visible spectral range and emits in the infrared spectral range and wherein said step of machine reading comprises measuring the infrared light emitted from said marking substance.

3. A method according to claim 1, wherein the marking substance is a fluorescent substance that is excitable and emits light in a spectral range that is pervious for the stamp and wherein said step of machine reading comprises measuring the light emitted from said fluorescent substance.

4. A method according to claim 3, wherein the fluorescent substance is chlorophyll.

5. A method according to claim 1, wherein the marking substance has magnetic properties and produces a magnetic field strength and wherein said step of machine reading comprises measuring the magnetic field strength of said marking substance.

6. A method according to claim 1, wherein the marking substance comprises electrically-conductive elements and wherein said step of machine reading comprises a capacitative measuring of conductivity of said marking substance.

7. A method according to claim 1, wherein said stamp comprises a stamp bearing on its surface a printed indication of a certain class or value and the adhesive layer of which is provided with a marking substance or marking substance combination characterizing that class or value, and wherein said step of making a determination of the validity of the stamp further includes determining whether the marking substance determined to be present properly belongs with the class or value indicated on the surface of the stamp.

8. A method according to claim 1, wherein the marking substance is patterned to provide a coding characterizing the stamp and wherein said step of machine reading comprises reading said pattern of marking substance.

9. A method according to claim 8, wherein the coding comprises a bar code.

10. A method according to claim 8, wherein the coding comprises concentric rings.

* * * * *